United States Patent
Nuss

(10) Patent No.: US 10,618,441 B2
(45) Date of Patent: Apr. 14, 2020

(54) MOTOR-VEHICLE HEADREST

(71) Applicant: GRAMMER AG, Amberg (DE)

(72) Inventor: Ralph Nuss, Poppenricht (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/621,585

(22) Filed: Feb. 13, 2015

(65) Prior Publication Data

US 2015/0232003 A1  Aug. 20, 2015

(30) Foreign Application Priority Data

Feb. 17, 2014 (DE) .................. 10 2014 001 980

(51) Int. Cl.
| | | |
|---|---|---|
| *B60N 2/844* | (2018.01) | |
| *B60N 2/856* | (2018.01) | |
| *B60N 2/847* | (2018.01) | |
| *B60N 2/853* | (2018.01) | |

(52) U.S. Cl.
CPC ............. *B60N 2/844* (2018.02); *B60N 2/847* (2018.02); *B60N 2/853* (2018.02); *B60N 2/856* (2018.02); *B60N 2205/20* (2013.01)

(58) Field of Classification Search
CPC ............................ B60N 2/4844; B60N 2/4852
USPC ........................................................ 297/408
See application file for complete search history.

(56) References Cited

U.S. PATENT DOCUMENTS

| | | | | |
|---|---|---|---|---|
| 6,983,995 B1 * | 1/2006 | Veine | ....................... | A47C 7/38 297/391 |
| 7,431,400 B2 * | 10/2008 | Brawner | .............. | B60N 2/4808 297/391 |
| 8,066,330 B2 * | 11/2011 | Keller | .................. | B60N 2/4855 297/403 |
| 8,083,291 B2 * | 12/2011 | Yoshida | ............... | B60N 2/4841 297/408 |
| 8,303,038 B2 * | 11/2012 | Smith | .................. | B60N 2/4864 297/404 |
| 8,348,347 B2 * | 1/2013 | Willard | ................ | B60N 2/4844 297/408 |
| 8,807,653 B2 * | 8/2014 | Yetukuri | ................ | B60N 2/847 297/408 |

(Continued)

FOREIGN PATENT DOCUMENTS

| | | | | |
|---|---|---|---|---|
| DE | 2525040 A1 * | 12/1976 | ........... | B60N 2/4844 |
| EP | 1990235 A1 | 11/2008 | | |

(Continued)

*Primary Examiner* — Timothy J Brindley
(74) *Attorney, Agent, or Firm* — Andrew Wilford

(57) ABSTRACT

The invention relates, among other things, to a head support (11) retained on the vehicle seat by at least one support rod (13) and movable, in particular pivotable, relative to the support rod (13) between at least two positions, wherein the head support (11) is lockable in at least one of the positions by a latch (18), the latch (18) has a bolt (19) and at least one abutment structure having at least one strike (23*a*, 23*b*), the bolt (19) is movable out of the one position engaging the strike (23*a*, 23*b*) and locking the head support (11), the bolt (19) is supported by at least one abutment of an abutment structure on the head support (11), and the abutment and the strike (23*a*, 23*b*) have at least one abutment face (26, 39, 41).

The novelty is that the bolt (19) is held in contact with at least one of the abutment faces (26, 39, 41) by at least one wedge device (31, 32, 33) and/or by at least one spring unit (25*a*, 25*b*).

7 Claims, 9 Drawing Sheets

(56) References Cited

U.S. PATENT DOCUMENTS

| | | | |
|---|---|---|---|
| 8,851,574 B2 * | 10/2014 | Yetukuri | B60N 2/4844 |
| | | | 297/408 |
| 8,852,574 B2 | 10/2014 | Pittenger | |
| 9,227,540 B2 * | 1/2016 | Hartlaub | B60N 2/2252 |
| 2007/0164593 A1 * | 7/2007 | Brockman | B60N 2/4847 |
| | | | 297/408 |
| 2007/0284929 A1 | 12/2007 | Keller et al. | |
| 2008/0203801 A1 * | 8/2008 | Jammalamadaka | B60N 2/4855 |
| | | | 297/408 |
| 2009/0021068 A1 | 1/2009 | Yamane et al. | |
| 2013/0140866 A1 | 6/2013 | Yetukuri et al. | |
| 2014/0203615 A1 * | 7/2014 | Little | B60N 2/4808 |
| | | | 297/408 |

FOREIGN PATENT DOCUMENTS

| | | | | |
|---|---|---|---|---|
| FR | 2112713 A5 * | 6/1972 | | B60N 2/4817 |
| JP | WO 2008120668 A1 * | 10/2008 | | B60N 2/4844 |

* cited by examiner

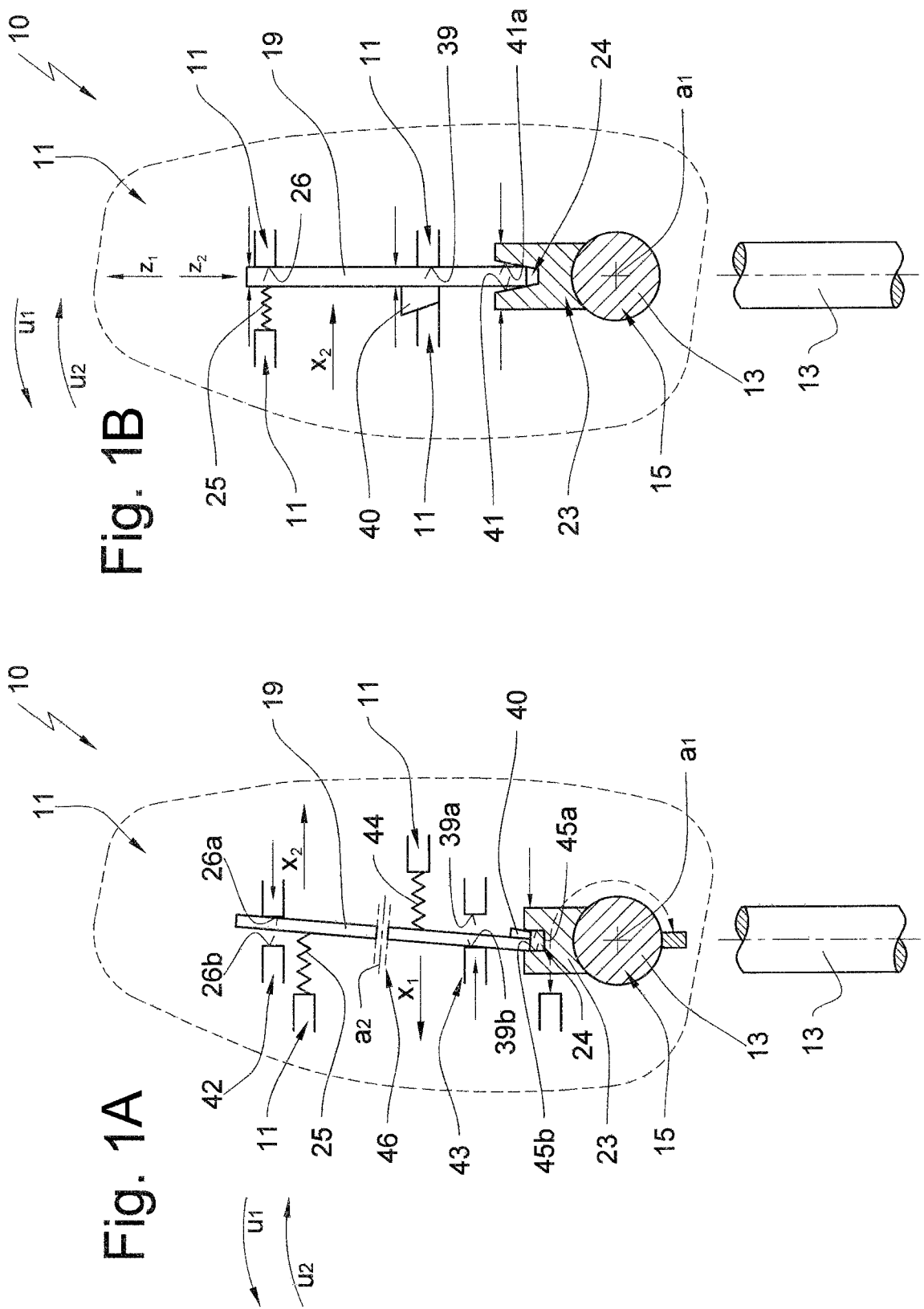

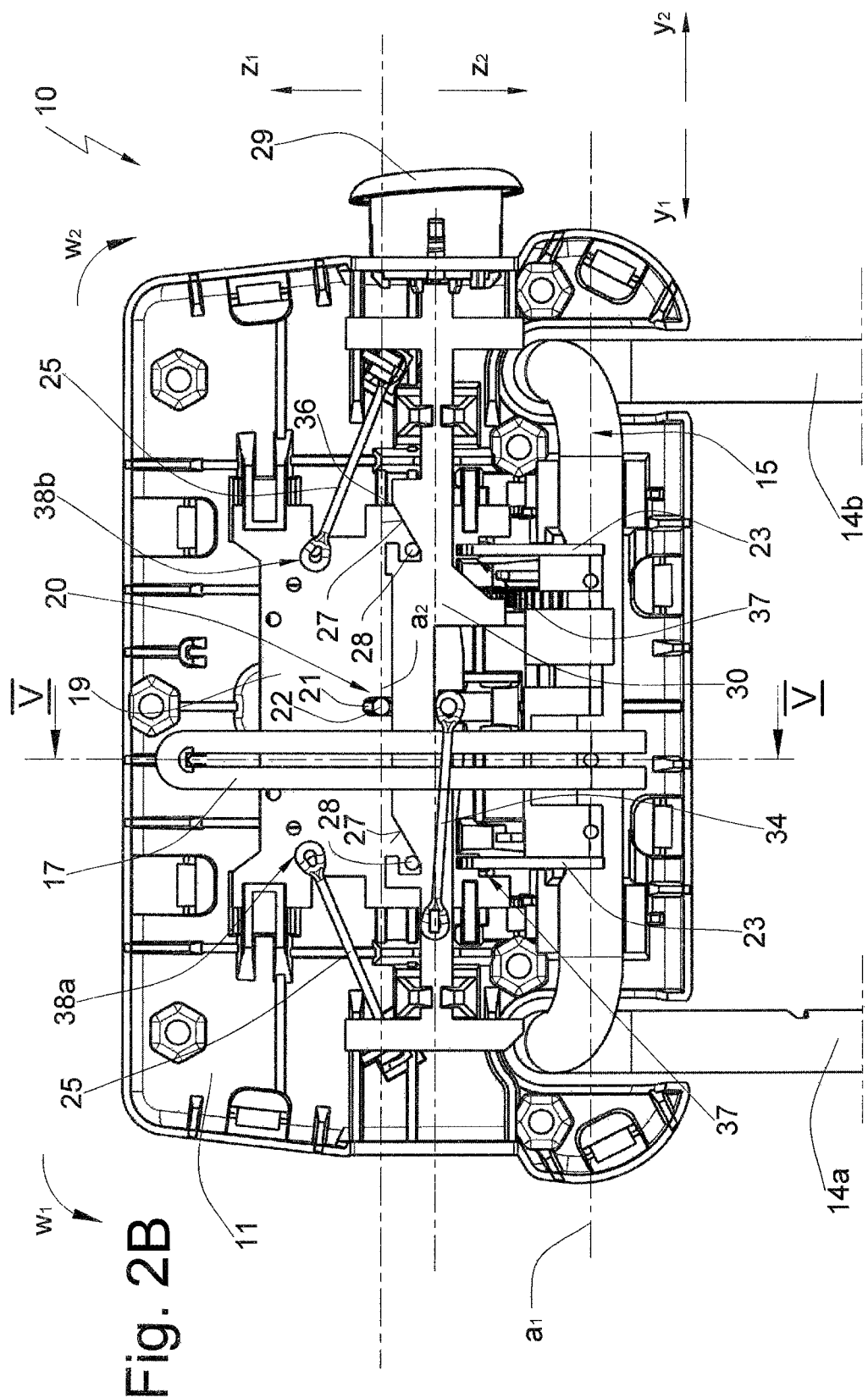

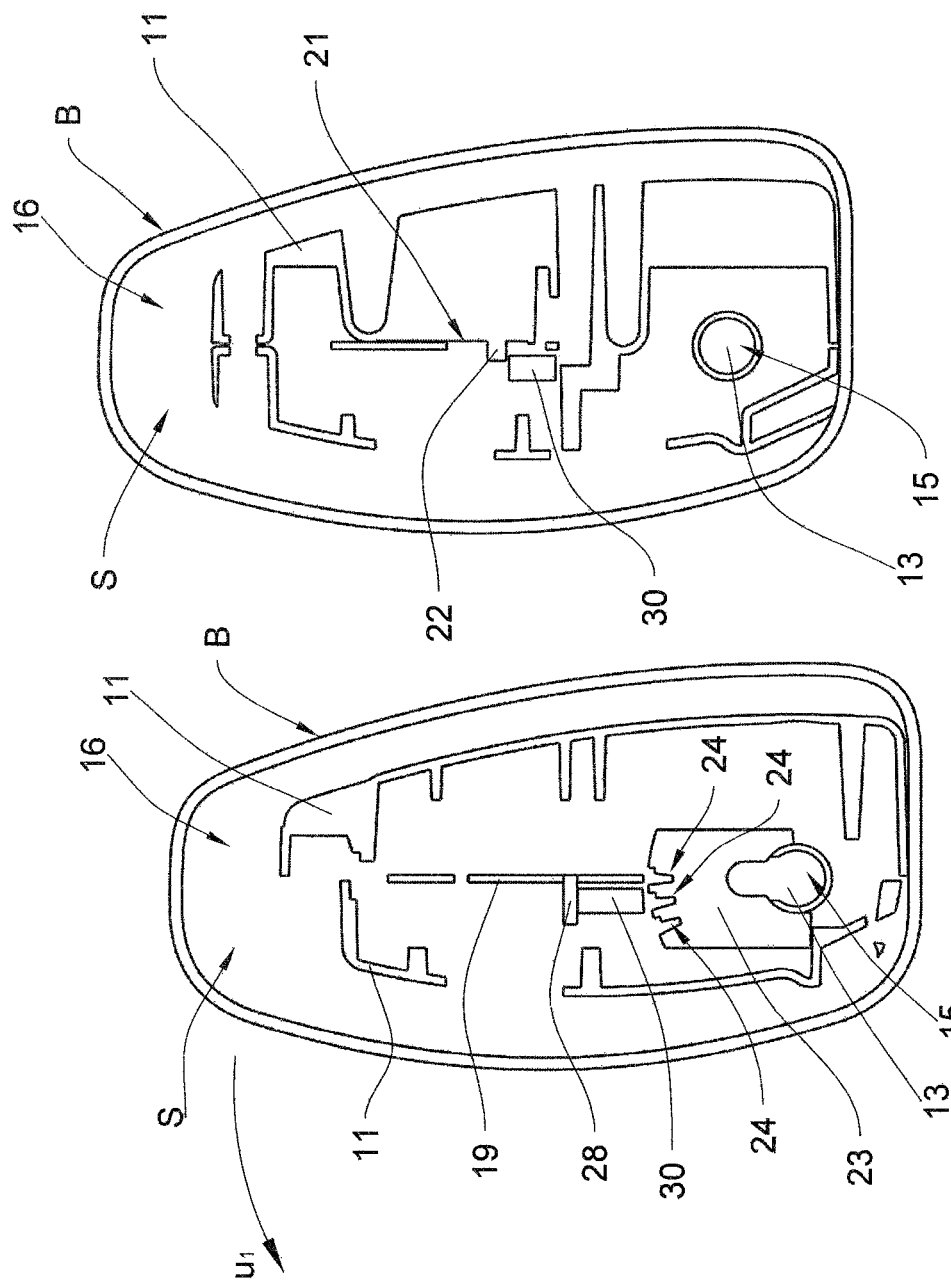

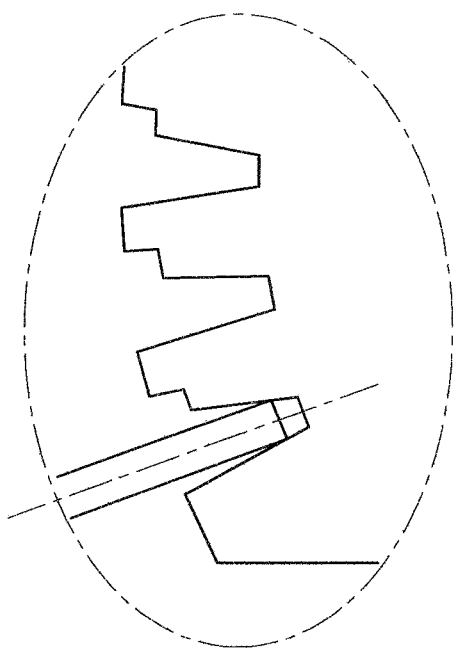
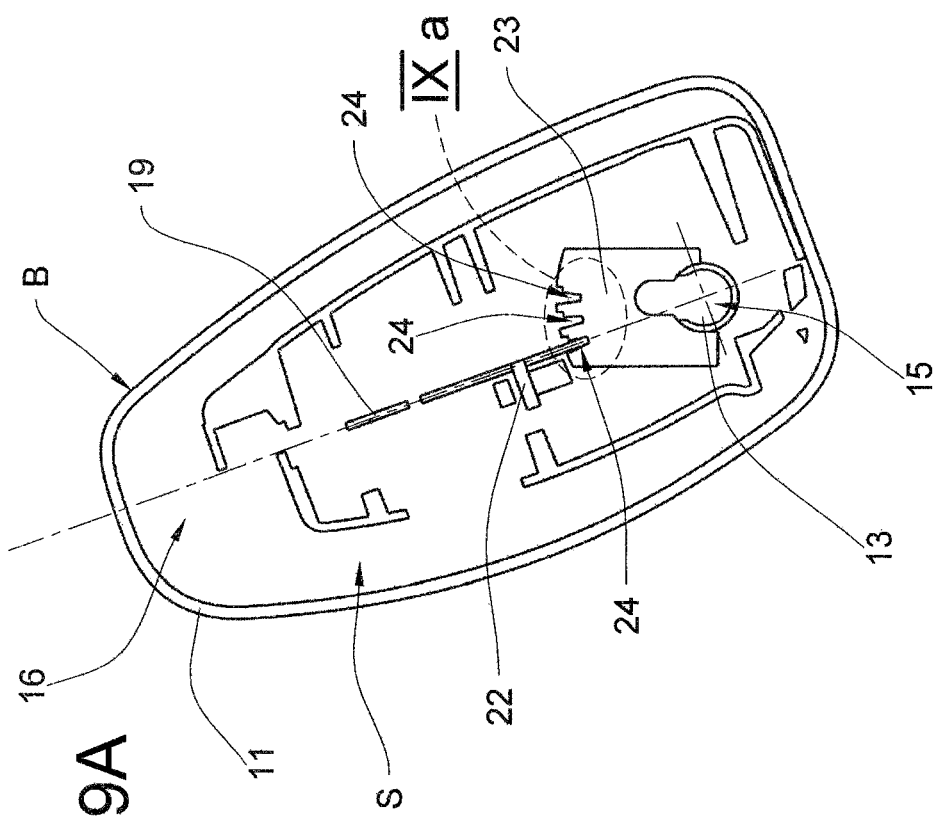

MOTOR-VEHICLE HEADREST

FIELD OF THE INVENTION

The invention relates to a headrest having a base and a head support, the base being mounted on a vehicle seat by at least one support rod.

BACKGROUND OF THE INVENTION

A vehicle seat according to the invention can be a seat for a land vehicle, an aircraft or a watercraft. A base according to the invention can be an element that is detachably fastened to the support rod or an element that is non-detachably and fixedly connected to the support rod. Furthermore, the base can also be a section of the support rod. A support rod according to the invention can be a rod having two opposite ends, the head support being mounted on one end and the other end being anchored in the backrest of a vehicle seat. A support rod according to the invention can also be a support rod bracket.

The head support is movable, in particular pivotable, relative to the base between at least one use position and at least one out-of-use position. For example, the head support is movable relative to the base fixed on the support rod or, as an alternative, can be moved directly on the support rod. Use position according to the invention means that in this position, the head support can serve as a counter support for the head of the seat occupant. Out-of-use position according to the invention means that the head support is pivoted into a position in which it does not serve as a head support. In the out-of-use position, the driver's vision to the rear is not impaired because the head support of the headrest does not or only insignificantly obstructs the driver's view. Moreover, the backrest can be tilted more easily because the head support protrudes only slightly beyond the backrest and therefore does not collide with other interior components of the vehicle.

In the use position and/or in the out-of-use position, the head support can be locked by a latch. The latch can be moved between a latched position and a release position. When moving between the latched position and the release position, a bolt of the latch can move in a straight line, rotate or carry out a mixed straight-line and rotational movement.

The latch has a bolt and at least one strike. For example, the bolt is associated with the head support and the strike is associated with the support rod. According to an alternative embodiment, the bolt is associated with the support rod and the strike is associated with the head support. In the latched position, the bolt is engaged with the strike, and in a release position, the bolt is disengaged from the strike. When the bolt is engaged in the strike, a movement of the head support is prevented in at least one direction.

The bolt is mounted on the head support by at least one abutment having at least one abutment face. For example, the abutment has a pair of abutment faces having two opposing abutment faces.

The bolt interacts with at least one strike. For example, the headrest has two strikes and the bolt can be brought simultaneously into detachable engagement with both strikes. The strike has at least one abutment face. For example, the strike has at least one pair of opposing abutment faces. The bolt can be put in detachable contact with at least one abutment face of the strike.

The bolt is mounted in at least one abutment of a guide. The abutment has at least one abutment face. If for example the abutment is associated with the head support, the abutment face can be a section of the head support for example. For example, the abutment face is formed as a point support so as to minimize the forces during the movement of the bolt. The abutment is provided with opposing abutment faces for example. The degree of freedom of the bolt is limited by the abutment face.

Such a headrest is known from prior public use.

This headrest has the disadvantage that due to the necessary tolerances between the components of the latch, in particular between the bolt and the abutment faces of the abutment and the strike, there is undesirable play of the head support, even if the latch is in the latched position.

OBJECT OF THE INVENTION

It was the object of the invention to create a headrest that has substantially no play, in particular with regard to a pivot movement of the head support.

SUMMARY OF THE INVENTION

The object was achieved according to a first aspect of the invention by a headrest in which, when the bolt is engaged on one of the abutment faces, the bolt is biased by at least one wedge device and/or at least one spring unit. A wedge device according to the invention is a device having a wedge that is carried on a strike. The wedge has two faces, wherein at least one of the faces forms an acute angle with respect to the moving direction of the wedge. A first face of the wedge is supported on a strike and a second face of the wedge biases the bolt into contact with an abutment face. The wedge for example is associated with the bolt or an element for actuating the bolt.

A spring unit according to the invention is a device having at least one spring that can be any conceivable elastically deformable reset element. In case the spring acts on the bolt, the spring urges the bolt against the abutment face of the abutment structure and/or the abutment structure.

The strike has at least one recess into which the bolt can be moved to be engaged therewith. The recess is V-shaped in the engagement direction of the bolt. According to the invention, this means that the recess is tapered in the engagement direction of the bolt. The recess can be, but does not necessarily have to be precisely V-shaped. Any conical tapering is covered by the term "V-shaped." The recess has two V-shaped inner faces that oppose one another. In the latched position, the bolt is in contact with the inner faces. Contact of the bolt with a first inner face of the recess prevents movement of the head support in a first moving direction, and contact of the bolt with a second inner face of the recess prevents movement of the head support in a second moving direction. Due to the contact of the bolt with both inner faces, movement of the head support in the first direction as well as in the second direction is prevented. The bolt for example is biased by a spring so as to engage on opposing faces of the V-shaped recess. The bolt for example is substantially formed as a plate. Plate according to the invention means that the face area is large in relation to the thickness. Plate according to the invention does not necessarily means that the bolt is flat. However, according to an embodiment, the bolt can be formed by a flat plate.

One embodiment is characterized in that the head support is pivotable between the use position and the out-of-use position. The pivot pin is formed for example by the traverse of a support rod bracket.

The strike for example has a recess structure comprising at least one recess. The bolt can be moved so as detachably engage with the recess. If the bolt is engaged with the recess, movement of the head support is not possible. If the bolt is disengaged from the recess, movement of the head support is possible. For example, the recess is formed in such a manner that the bolt can be moved so as to engage with the recess in at least one pivot position. In particular, the recess structure of the strike has a plurality of recesses. In this case, the bolt can be moved so as to engage with one of the recesses in a plurality of pivot positions. When the bolt is moved to engage with the recess, a section of the bolt is situated for example between two abutment faces of the recess. For example, the recess is V-shaped, wherein the recess is tapered toward a bottom of the recess.

Another embodiment is characterized in that the head support is biased into the out-of-use position by a reset device. This has the advantage that the headrest moves automatically into the out-of-use position as soon as the latch has been moved into the release position. The reset device has for example a silicone spring that biases the head support into the out-of-use position.

The bolt can be moved in a straight line and/or rotated between the latched position and the release position for example by the guide. The bolt for example can be displaced in a straight line and, in addition, can be rotated about at least one spatial axis. For example, the bolt can be rotated about two axes that are arranged perpendicular to one another. One of these axes for example runs radially to a traverse of a support rod bracket, wherein the traverse forms the pivot pin for the head support.

According to one embodiment of the invention, the spring is formed by a silicone spring.

One embodiment is characterized in that the bolt is biased into the latched position by a reset device. For example, the bolt is biased into the latched position. The reset device has for example a reset element, in particular a silicone spring.

An abutment of the guide has for example a pin that is guided in a slot. For example, the pin is associated with the head support and the slot is associated with the bolt.

According to another embodiment, the latch has a slide. The slide can be actuated for example by a user by actuation on the outside of the head support.

One embodiment is characterized in that a movement converter is formed between the slide and the bolt. The movement converter converts the movement of the slide in a first direction into a movement of the slide in a second direction. The second direction is perpendicular to the first direction for example. The movement converter can be formed for example by interacting angular faces of the slide and the bolt.

BRIEF DESCRIPTION OF THE DRAWING

Further advantages of the invention arise from the description of an embodiment shown in the figures. The schematic figures show:

FIG. 1A is a schematic section through a first embodiment of the headrest according to the invention, FIG. 1B is a schematic section through a second embodiment of the headrest according to the invention, FIG. 2B is a front view of the headrest of FIGS. 1A and 1B, a front housing half of the head support of the headrest as well as a cushion not being shown, FIG. 6 is a section like FIG. 3 with the latch in the release position, FIG. 7 is a section like FIG. 4 with the latch in the release position, FIG. 9A is a section like FIG. 3 with the head support in a second use position and the latch in the latched position, FIG. 9B is a the detail indicated at IXa in FIG. 9A.

SPECIFIC DESCRIPTION OF THE INVENTION

Figure 2A:
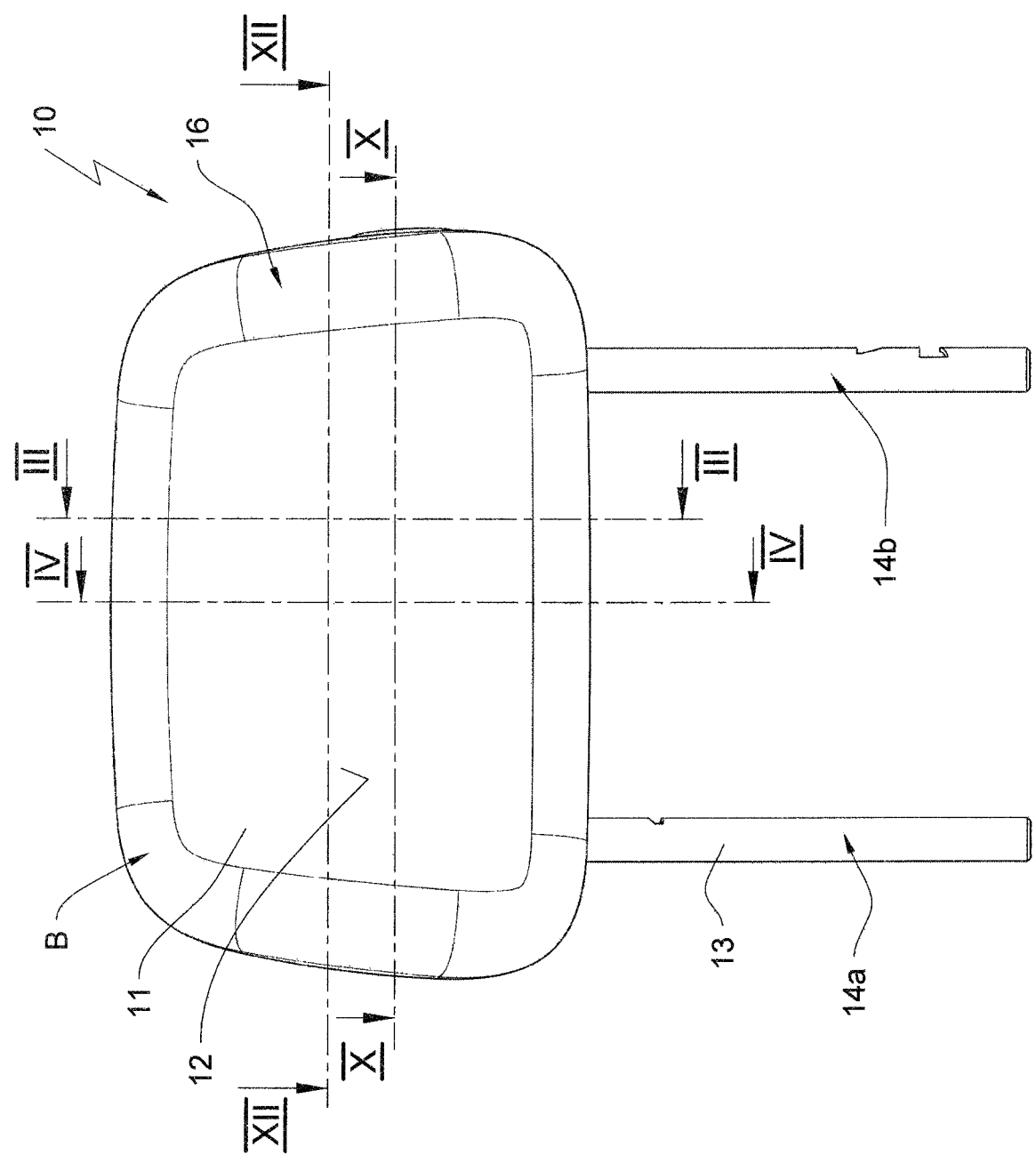
FIG. 2A is a front view of a headrest in a first use position.
Figure 5:
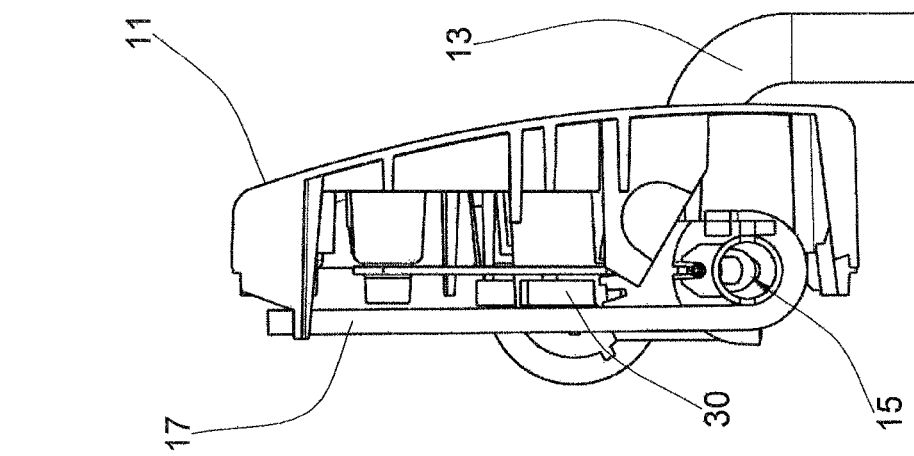
FIG. 5 is a section taken along line V-V of FIG. 2A.
Figure 4:
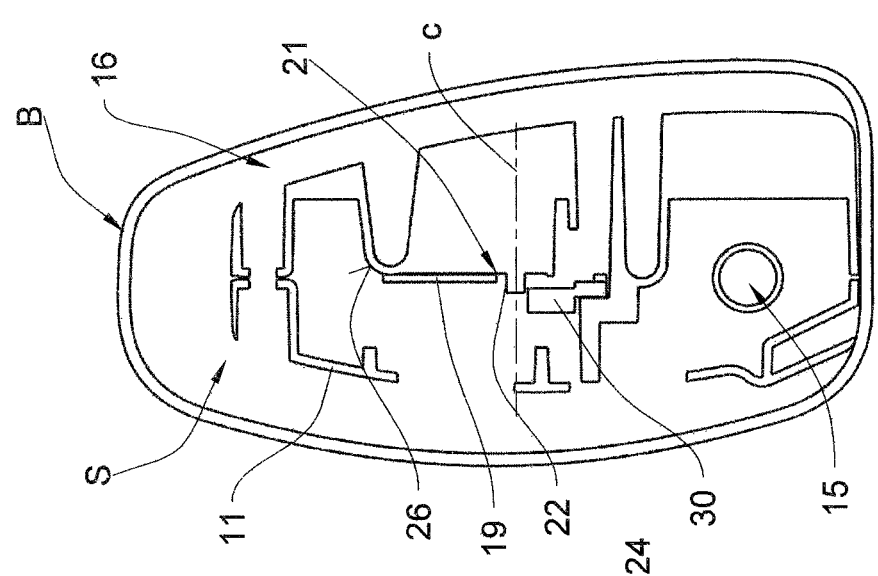
FIG. 4 is a section taken along line IV-IV of FIG. 2A.

The headrest according to the invention is designated is overall in the drawings at 10. The same reference numerals in the different figures designate corresponding parts, even if the reference numerals are followed by lower-case letters.

FIGS. 1A and 1B illustrate two embodiments of the headrest. The headrest of FIG. 1A has a head support 11 that is mounted on a traverse 15 of a support rod bracket 13 for pivoting about an axis a1. A bolt 19 is mounted on the head support 11 by a pivot abutment 46 to be pivotable about an axis a2. Furthermore, the bolt 19 is mounted with an abutment 42 having abutment faces 26a and 26b, and also with an abutment 43 that has abutment faces 39a and 39b and that is spaced from the abutment 42. The abutments 42 and 43 are part of the head support 11.

A spring 25 effective in a direction x2 urges the bolt 19 into contact with the abutment face 26a of the abutment 42. A spring 44 supported on the head support 11 urges to the bolt 19 in the direction x1 toward contact with the abutment face 39b of the abutment 43.

A strike 23 formed with at least one recess 24 is fixed on the traverse 15. The recess 24 has inner faces 45a and 45b that prevent movement of the head support 11 in the directions u1 and u2 when the bolt 19 is engaged in the recess 24, as in FIG. 1A. The bolt 19 is biased in the direction x1 by a wedge 40 into contact with the inner face 45b. The wedge 40 is supported on the inner face 45a. Through this play-free mounting, play between the bolt 19 and the head support 11 and also between the bolt 19 and the strike 23 is prevented.

The head rest according to the second embodiment shown in FIG. 1B has a head support 11 mounted on a traverse 15 of a support rod bracket 13 and pivotable about an axis a1. A bolt 19 is mounted on the head support 11 to be movable in the directions z1 and z2. The bolt 19 is also mounted in an abutment 42 having an abutment face 26 and in an abutment 43 having an abutment face 39. The abutments 42 and 43 are part of the head support 11. A spring 25 effective in the direction x2 urges to the bolt 19 into contact with the abutment face 26 of the abutment 42. A wedge 40 supported on the head support part 11 urges the bolt 19 in the direction x1 into contact with the abutment face 39 of the abutment 43.

A strike 23 formed with at least one recess 24 is fixed on the traverse 15. The recess 24 has inner faces 41a and 41b that prevent movement of the head support 11 in the directions u1 and u2 when the bolt 19 is engaged with the recess 24, as shown in FIG. 1B. The bolt 19 is biased in the direction z2 by the spring 25 or, alternatively, by a separate spring, which is not shown, and is in contact with the two inner faces 41a and 41b. Thus, when the bolt is engaged with the recess 24, the bolt is also in contact with both inner faces 41a and 41b. The play-free mounting prevents play between the bolt 19 and the head support 11 and also between the bolt 19 and the strike 23.

FIGS. 2A to 13 show in more detail an embodiment of the head rest 10 that corresponds to the schematic diagram of FIG. 1B. A head support 11 of the headrest 10 is in a first use position. According to FIGS. 1A and 1B, the head support 11 is provided with a cushion 16 that has a cover B and a foam part S (not visible in FIGS. 1A and 1B). The head support 11 forms a head support face 12 on which the head of the seat occupant can be supported in one of the use positions.

The head support 11 is mounted on a support rod bracket 13. The support rod bracket 13 has legs 14a and 14b and a traverse 15 (not shown in FIGS. 1A and 1B). The legs 14a and 14b slide in abutments that are not shown and that are secured on a vehicle seat that is likewise not shown. The traverse 15 forms the axis a1 for pivoting of the head support 11.

Figure 13:
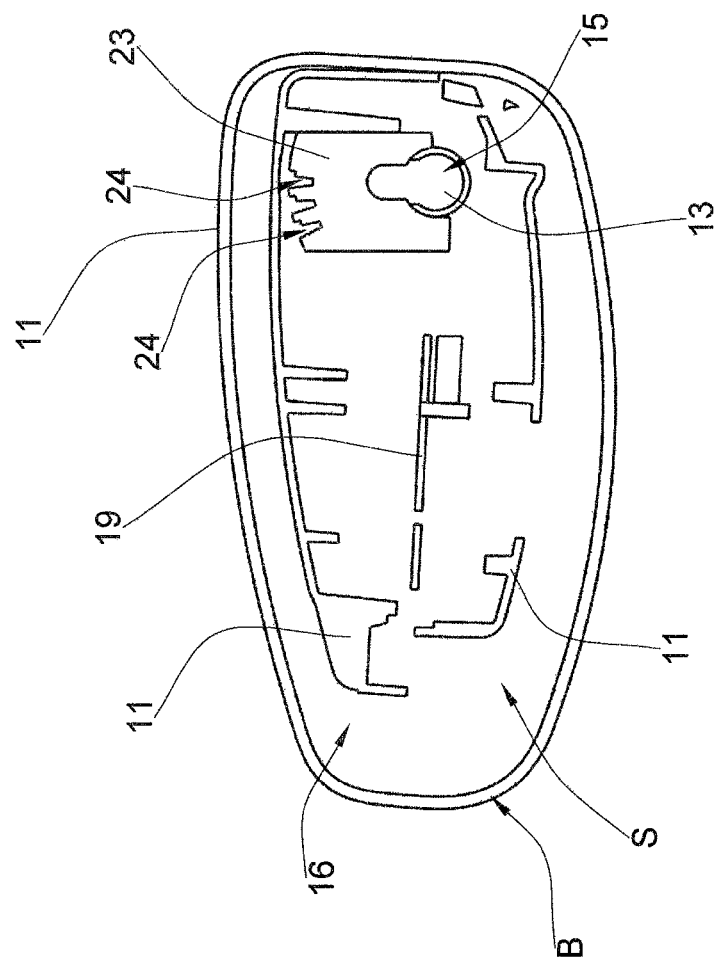
FIG. 13 is a view like FIGS. 9A and 9B with the headrest in the out-of-use position.

The head support 11 is biased into the out-of-use position by a reset element 17 (see FIGS. 2A and 2B) that is configured as a silicone spring in this embodiment. The head support 11 can be displaced in the directions u1 and u2 into different use positions and also into an out-of-use position. In FIG. 3 for example the head support 11 is shown in a first use position. From the first use position, it can be displaced in the direction u1 into other use positions as well as into an out-of-use position. A second use position is shown for example in FIGS. 9A and 9B, and the out-of-use position is shown in FIG. 13. From the use position of FIGS. 9A and 9B, the head support 11 can be pivoted in the directions u1 and u2.

The head support 11 can be locked in different use positions by a latch 18. When the latch 18 is in the latched position, as shown for example in FIGS. 3, 9A and 9B, the head support 11 cannot be pivoted. When the latch 18 is displaced into the release position, the head support 11 can be pivoted.

Figure 3:
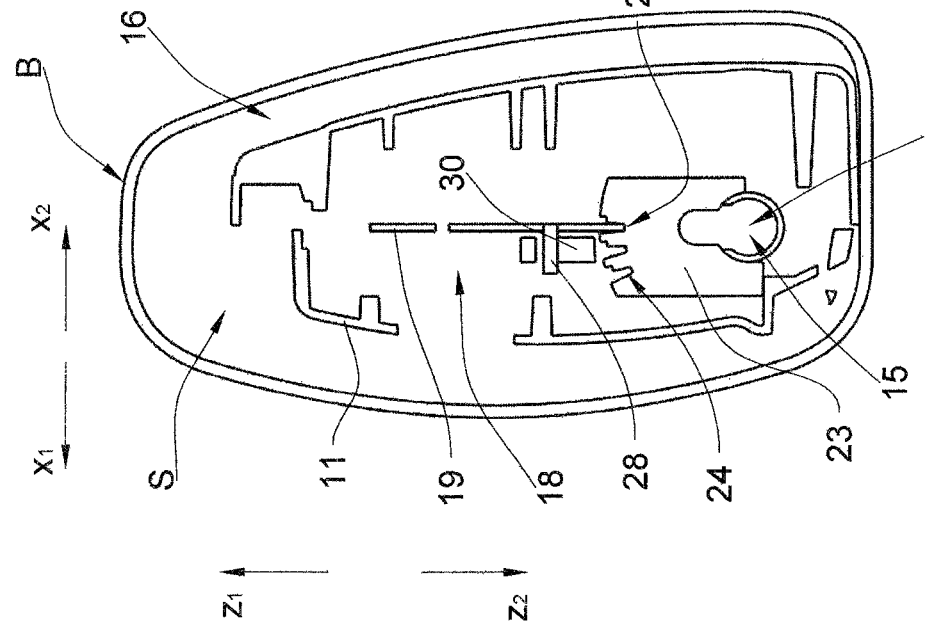
FIG. 3 is a section taken along line III-III of FIG. 2A.

The latch 18 has a bolt 19 that can be moved in the directions z1 and z2 (see for example FIGS. 2A and 2B). The bolt 19 is carried during such movement by a guide 20 formed by a slot 21 formed on the bolt 19 and also a pin 22 fixed to the head support 11. The guide allows movement not only in the directions z1 and z2, but also a slight pivoting of the bolt 19 about the axis a2 in the directions w1, w2, the pin 22 forming the axis a2. Moreover, the mount also enables pivoting of the bolt 19 about an axis a3 in the direction v1, v2 (see FIG. 12). Furthermore, the guide 20 has an abutment face 26 and an abutment face 39. The abutment faces 26 and 39 are on the head support 11.

The strike has faces 23a and 23b that extend radially of the axis a and are fixed on the traverse 15 (see for example FIG. 3). Recesses 24 form the strike faces 23a and 23b. The recesses 24 are arrayed on a circular arc whose center axis is the axis a. When the latching regions 37 of the bolt 19 engage with one of the recesses 24 (see for example FIGS. 3, 9A and 9B), the latch 18 is in the latched position and the head support 11 cannot be pivoted in the direction u1 or u2. If the bolt 19 is disengaged from the recesses 24 (see for example FIGS. 6 and 8), the latch 18 is in the release position and the head support 11 can be pivoted.

In the latched position, the bolt 19 is engaged with a recess 24 of the strike face 23a and with a recess of the strike face 23. Each of the recesses 24 has two opposing V-shaped inner faces 41a and 41b. The bolt 19 is in contact with the inner faces 41a and 41b when the latch 18 is in the latched position. The inner face 41a prevents movement in the direction u1, and the inner face 41b prevents movement in the direction u2. In this manner, there is no play of the bolt 19 in the recess 24.

The contact of the bolt 19 with the inner faces 41a and 41b of the recesses of both strike faces 23a and 23b is possible because the bolt 19 can be pivoted about the axis a2 and about the axis a3 and can be displaced in the directions z1 and z2. If the bolt 19 according to an alternative embodiment worked with only a single strike face, the guide 20 could be formed in such a manner that the bolt would be movable only in the directions z1 and z2. The movability in the directions w1, w2 as well as v1, v2 could be omitted.

Springs 25 each have one end fastened to the bolt 19 and another end fastened to the head support 11. In the present embodiment, the springs 25 are silicone springs. However, as an alternative, other reset element can also be used for example. The springs 25 are oriented such that they bias the bolt 19 in the direction z2 into the latched position, and in the direction x1 into engagement on an abutment face 26 of the head support 11. The abutment face 26 forms an upper abutment for the bolt 19. However, according to an alternative embodiment, separate springs can also be provided for biasing in the direction x1 and biasing in the direction z2.

The attachment of the springs 25a and 25b is in each case in upper end regions 38a and 38b of the bolt 19. For this reason, the upper region of the bolt 19 is held on the abutment face 26 and does not move away from contact with the abutment face 26.

The latch 18 has a slide 30. The slide 30 is provided with ramps 27 that interact with pins 28 fixed to the bolt 19. The bolt 19 can be moved from the position shown in FIGS. 2A and 2B in the direction y1 by actuating a button 29. With decreasing force acting on the button 29, the bolt 19 is moved back in the direction y2 by a spring 34 having one end attached to the slide 30 and another end attached to the head support 11. The spring 34 is tensioned when the slide 30 is moved in the direction y1.

During movement of the slide 30 in the direction y1, the pins 28 move along the ramps 27 from a lower region 35 to an upper region 36. Due to the guiding of the slot 21 and the pin 22, the bolt 19 is moved so to disengage from the recesses 24.

Figure 8:
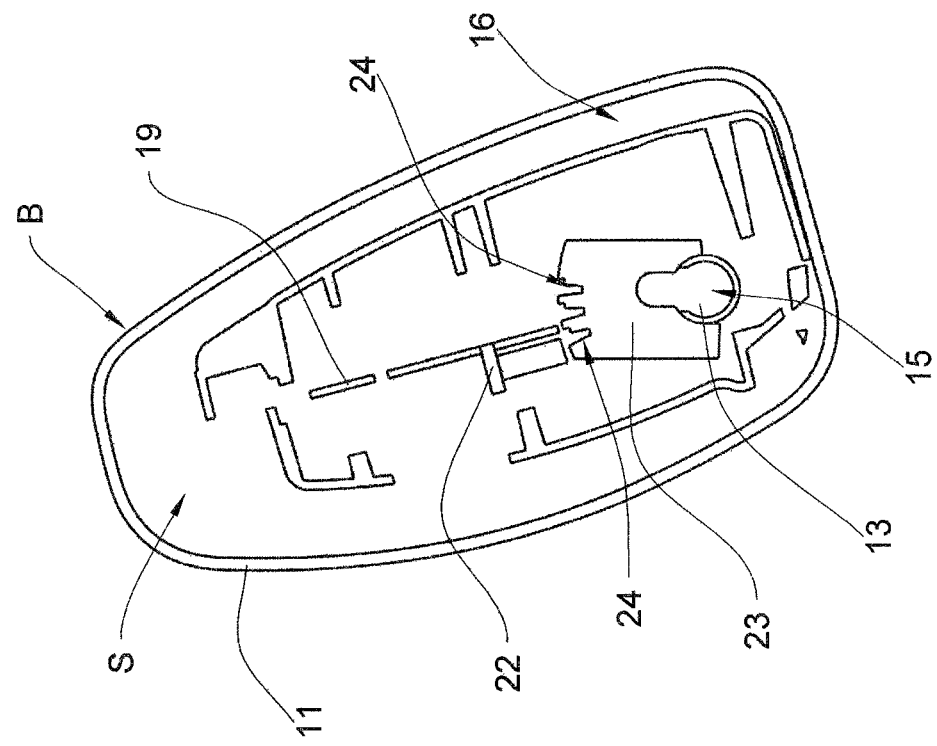
FIG. 8 is a section like FIG. 6 with the head support in an intermediate position.

The latch 18 is in the release position when the bolt 19 is disengaged from one of the recesses 24 of both of the strike faces 23a and 23b (see FIG. 6 and FIG. 8). In the latched position 18 of FIGS. 2 to 3, 9A, 9B, and 10, the pins 28 are situated at lower regions 35 of the ramps 27, and the bolt 19 is engaged with the recesses 24 of the strike faces 23a and 23b.

Figure 10:
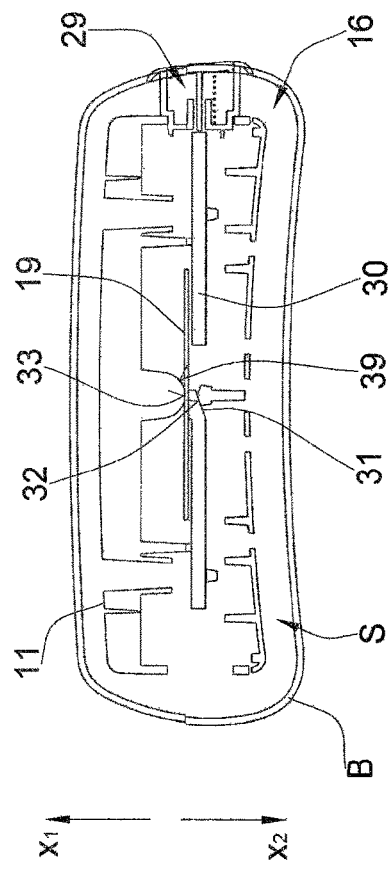
FIG. 10 is a cross-section taken along line X-X in FIGS. 1A and 1B, a slide being shown in the latched position of the latch.
Figure 11:
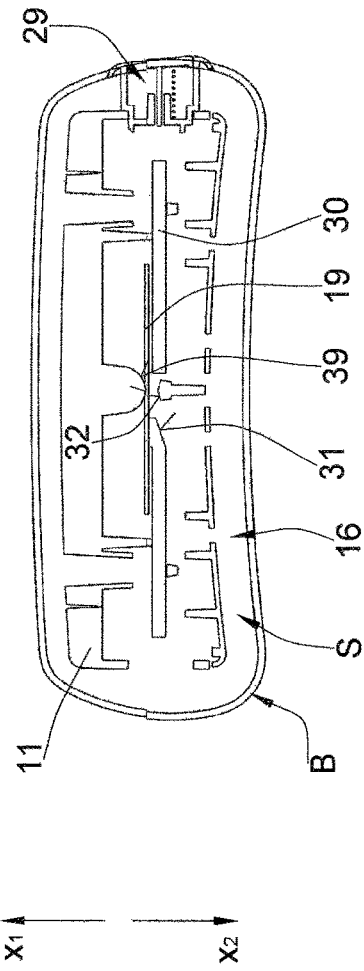
FIG. 11 is a cross-section like FIG. 10, the slide being shown in the release position of the latch.
Figure 12:
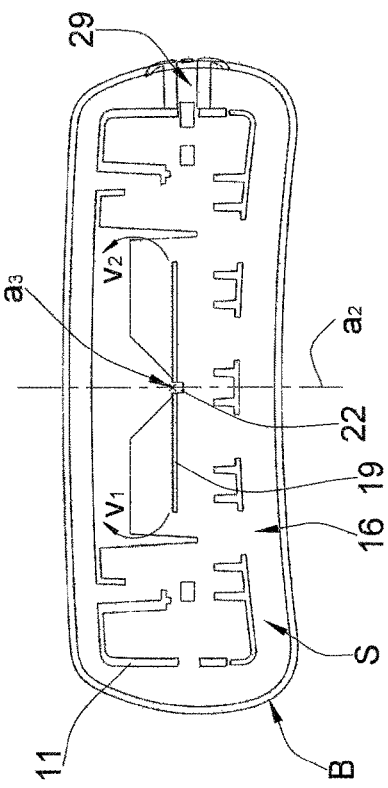
FIG. 12 is a cross-section taken along line XII-XII in FIGS. 1A and 1B.

According to the FIGS. 10 and 11, the slide 30 has a wedge 40 with a support face 31 and a pressing face 33, the support face 31 extending at an acute angle to the pressing face 33 and to the moving directions y1 and y2 of the slide 30. The support face interacts with a abutment face 32 of the head support 11. When the slide 30 is moved in the direction y2, the wedge 40 moves between the abutment face 32 and the abutment face 39. When the pins 28 of the bolt 19 are situated at the lower region 35 of the ramp 27, the springs 25a and 25b move the bolt 19 into engagement with the recesses 24 of the strike faces 23a and 23b.

While the slide 30 is moved by the spring 34 in the direction y2, a force deflection takes place by the support face 31 in such a manner that a portion of the force of the spring 34 acting in the direction y2 is deflected so as to form a force acting in the direction x1. In this manner, the slide 30 applies a load to the bolt 19 by the pressing face 33 so that the bolt comes into contact with the abutment face 39. In this manner, the bolt 19 is held without play between the pressing face 33 and the abutment face 39.

The function of the headrest 10 is described below. According to the FIGS. 1 to 5, the head support 11 is in the first use position. The latch 18 is in the latched position. If the head support 11 is to be displaced into a different use position, the user actuates the button 29. The slide 30 is moved by the button 29 in the direction y1. The bolt 19 is moved by the ramps 27 and the pins 28 against the force of the springs 25a and 25b in the direction z1 so as to disengage from the strike faces 23. The latch 18 is then in the release position of FIG. 6. The head support 11 can now be pivoted about the axis a1 in the direction u1. According to FIG. 8, the head support 11 is in an intermediate position.

As soon as the button 29 is no longer actuated, the spring 34 pulls the slide 30 in the direction y2. The bolt 19 is moved by the springs 25a and 25b in the direction z2. While this takes place, the pins 28 move to the lower end of the ramp 27, and the bolt 19 moves into engagement with another recess 24 of the strike 23 (see FIGS. 9A, 9B, and 10). According to FIGS. 9A and 9B, the latch 18 is in the latched position. The head support 11 is locked in a second use position.

During the entire movement between the latched position and the release position, the springs 25a and 25b hold the bolt 19 on the guide face 26 of the first abutment. In the latched position, the bolt 19 is also held by the wedge 40 on the abutment face 39 of the second abutment. Because the springs 25a and 25b hold the bolt 19 in the latched position so as to keep the contact with the opposing faces 23a and 23b of the V-shaped recess 24, there is no play of the bolt 19 within the recess 24.

If the head support 11 is to be pivoted into the out-of-use position, the latch 18 is moved into the release position, as described above. The head support 11 can then be pivoted in the direction u1 into the out-of-use position. In the present embodiment, the head support 11 is not locked in the out-of-use position. However, according to an alternative embodiment, which is not shown, the head support 11 could also be engaged with the strike faces 23a and 23b in the out-of-use position and could be locked in this manner.

From the out-of-use position, the head support 11 can be pivoted in the direction u2. The latch 18 is moved into the release position. When the desired use position is reached, the latch 18 is moved into the latched position by releasing the button 29. Then, the head support 11 is locked in the corresponding use position.

The invention claimed is:

1. A vehicular headrest comprising:
   a rod;
   a head support pivotal on the rod about an axis between angularly offset positions;
   a strike fixed to the rod and formed with a radially outwardly open recess having a strike face;
   a latch bolt limitedly movable on the support between
      a latched position engaged in the recess and preventing pivoting of the head support on the rod in at least one pivot direction by contact of the bolt with the strike face and
      a release position clear of the recess and freeing the head support to pivot on the rod; and
   a wedge braced against the support and urging the bolt against the strike face.

2. A vehicular headrest comprising:
   a rod;
   a support pivotal on the rod about an axis between angularly offset positions;
   a strike fixed to the rod and formed with a strike face;
   a latch bolt limitedly movable on the support between
      a latched position engaged in the recess and preventing pivoting of the support on the rod in at least one pivot direction by contact of the bolt with the strike face, and
      a release position clear of the recess and freeing the support to pivot on the rod;
   a biasing element braced against the support and urging the bolt into the latched position and against the strike face;
   an abutment on the support and having an abutment face engageable with the bolt to limit freedom of motion of the bolt relative to the support; and
   another biasing element braced against the support and urging the bolt against the abutment face.

3. The headrest defined in claim 2, wherein the support can be moved between at least one use position and at least one out-of-use position.

4. The headrest defined in claim 3, wherein the support is biased into the out-of-use position by a reset device.

5. The headrest defined in claim 2, wherein the bolt can be moved in a straight line and/or rotated.

6. The headrest defined in claim 2, wherein the biasing element is a spring.

7. A vehicular headrest comprising:
   a rod;
   a head support pivotal on the rod about an axis between angularly offset positions;
   a strike fixed to the rod and formed with a radially outwardly open recess having a strike face;
   a latch bolt movable on the support between
      a latched position engaged in the recess and preventing pivoting of the head support on the rod in at least one pivot direction by contact of the bolt with the strike face and
      a release position clear of the recess and freeing the head support to pivot on the rod,
   the bolt being limitedly movable on the head support;
      an abutment on the support and having an abutment face engageable with the bolt to limit freedom of motion of the bolt relative to the support; and
      a biasing element braced against the support and urging the bolt against the abutment face.

* * * * *